(12) United States Patent
Libin

(10) Patent No.: US 12,046,261 B1
(45) Date of Patent: Jul. 23, 2024

(54) ADAPTIVE AUDIO-VISUAL BACKDROPS AND VIRTUAL COACH FOR IMMERSIVE ASYNCHRONOUS VIDEO CONTENT

(71) Applicant: mmhmm inc., Little Rock, CA (US)

(72) Inventor: Phil Libin, Bentonville, AR (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 18/141,618

(22) Filed: May 1, 2023

Related U.S. Application Data

(63) Continuation-in-part of application No. 17/491,561, filed on Oct. 1, 2021, now Pat. No. 11,677,575.

(60) Provisional application No. 63/087,593, filed on Oct. 5, 2020.

(51) Int. Cl.
```
G11B 27/036    (2006.01)
G06V 40/10     (2022.01)
G06V 40/20     (2022.01)
G09B 19/04     (2006.01)
```

(52) U.S. Cl.
CPC ............ *G11B 27/036* (2013.01); *G06V 40/15* (2022.01); *G06V 40/20* (2022.01); *G09B 19/04* (2013.01)

(58) Field of Classification Search
None
See application file for complete search history.

(56) References Cited

U.S. PATENT DOCUMENTS

| | | | |
|---|---|---|---|
| 10,515,561 B1 * | 12/2019 | Fieldman | G09B 7/00 |
| 11,074,939 B1 * | 7/2021 | Malinowski | G10L 15/183 |
| 2009/0327425 A1 * | 12/2009 | Gudipaty | H04N 7/147 |
| | | | 709/205 |

(Continued)

FOREIGN PATENT DOCUMENTS

WO   WO-2022093356 A1 *   5/2022   ......... G06K 9/00315

OTHER PUBLICATIONS

F. Domínguez et al., "Scaling and Adopting a Multimodal Learning Analytics Application in an Institution-Wide Setting," Jun. 2021, IEEE Transactions on Learning Technologies, vol. 14, No. 3, pp. 400-414. (Year: 2021).*

*Primary Examiner* — Phyllis A Book
(74) *Attorney, Agent, or Firm* — Muirhead and Saturnelli, LLC

(57) ABSTRACT

Adapting an asynchronous audio-visual presentation includes storing custom backdrops prior to presenting the asynchronous audio-visual presentation, assessing a degree of engagement for at least some of the participants by monitoring participant reactions and feedback while presenting the asynchronous audio-visual presentation, and modifying the asynchronous audio-visual presentation based on the degree of engagement of at least some of the participants by replacing a backdrop of the asynchronous audio-visual presentation with one of the custom backdrops. The degree of engagement of each of the participants may be positive/productive, angry/over-reacting, or indifferent. The degree of engagement of each of the participants may be based, at least in part, on non-verbal cues. The non-verbal cues may include postures, gestures, gaze direction and facial expressions that are captured by cameras of the participants and/or physiological parameters of at least some (Continued)

of the participants. A single participant or multiple participants may view the asynchronous audio-visual presentation.

16 Claims, 5 Drawing Sheets

(56) References Cited

U.S. PATENT DOCUMENTS

| | | | | |
|---|---|---|---|---|
| 2015/0154291 A1* | 6/2015 | Shepherd | ............ | H04L 67/535 |
| | | | | 707/748 |
| 2015/0169069 A1* | 6/2015 | Lo | ............ | H04L 65/403 |
| | | | | 715/753 |
| 2016/0072862 A1* | 3/2016 | Bader-Natal | ............ | H04N 7/15 |
| | | | | 715/755 |
| 2021/0176429 A1* | 6/2021 | Peters | ............ | G06V 20/41 |
| 2021/0224765 A1* | 7/2021 | Siddique | ............ | G06Q 30/0643 |
| 2021/0326586 A1* | 10/2021 | Sorci | ............ | A61B 5/746 |
| 2022/0141266 A1* | 5/2022 | Cossar | ............ | G10L 25/63 |
| | | | | 348/14.04 |
| 2022/0239516 A1* | 7/2022 | Iyer | ............ | H04L 12/1831 |
| 2023/0152906 A1* | 5/2023 | Jorasch | ............ | H04L 12/1822 |
| | | | | 345/156 |
| 2023/0199039 A1* | 6/2023 | Nguyen | ............ | H04L 65/4015 |
| | | | | 709/204 |

\* cited by examiner

ADAPTIVE AUDIO-VISUAL BACKDROPS AND VIRTUAL COACH FOR IMMERSIVE ASYNCHRONOUS VIDEO CONTENT

CROSS-REFERENCE TO RELATED APPLICATIONS

This application is a continuation-in-part of U.S. patent application Ser. No. 17/491,561, filed on Oct. 1, 2021, and entitled "ADAPTIVE AUDIO-VISUAL BACKDROPS AND VIRTUAL COACH FOR IMMERSIVE VIDEO CONFERENCE SPACES", which claims priority to U.S. Prov. App. No. 63/087,593, filed on Oct. 5, 2020, and entitled "ADAPTIVE AUDIO-VISUAL BACKDROPS AND VIRTUAL COACH FOR IMMERSIVE VIDEO CONFERENCE SPACES", both of which is incorporated herein by reference.

TECHNICAL FIELD

This application is directed to the field of information processing and video recording, and more specifically to the field of supplying a virtual coach of an author of immersive video content and offering adaptive visual backdrop and audio supplements to the pre-recorded content.

BACKGROUND OF THE INVENTION

With the rise of the geographically dispersed workforce and the proliferation of remote and distributed work style, an asynchronous content created by employees and viewed by co-workers, customers, partners and other third parties, individually or in teams, through enterprise video repositories, such as mmhmm TV channels, and through other venues is augmenting in-person meetings and video conferencing and, on many occasions, can replace them.

Video content is quickly emerging as a dominant productivity, educational and entertainment medium for the contemporary business and homes with business applications that include professional training, education, e-commerce, marketing, product development and support, business communications and presentations, hiring and onboarding, consulting, etc. According to market research, the size of global enterprise video market will grow from $33 billion in 2020 to $49 billion by 2030, with its largest segment representing marketing and sales in Banking, Financial Services, and Insurance.

An average person spends about 100 minutes per day watching online video content. 95% of Internet users watch product and service illustrations in the form of explainer videos; polls show that 84% of the watchers made purchase decision after learning product and service features from such videos. It is estimated that viewers can retain about 95% of the information found in a video content compared to just 10% information after consuming textual information.

Video sharing and streaming among employees, customers, and partners without a need for content authors to present their work in front of the viewers in live physical meetings and in video conferences may offer significant time saving, increases flexibility of individual work, cuts down coordination and arrangement of meeting schedules, eliminates time zone barriers, and brings productivity boost to all participants of the video creation and consumption process. In this way, creation of the video content becomes increasingly separated from other the synchronous communications between the content author and the content viewers.

Public, group, and enterprise video repositories may store video content in multiple formats, provide hosting, authoring, editing, and sharing options, content categorization and tagging, authoring and usage analytics, social features, etc. Such repositories may include libraries of reusable video content for content creators and commenters. Notable examples of dedicated video repositories and platforms for public online video streaming include YouTube, Twitch, Aparat, IQiyi, Vimeo, Youku. General sites and social networks, such as Facebook, Tencent, Sina Weibo, Instagram, Twitter. Brightcove, DaCast, Dailymotion Cloud may offer video hosting among their features, while online video editing services Animoto, Clesh, Dailymotion, Blackbird, etc. have emerged as popular video hosting providers for businesses.

New trends in layouts and creation processes of advanced video presentations offer multiple opportunities and require overcoming certain obstacles, as explained below.

SUMMARY OF THE INVENTION

Immersive multi-user interfaces pioneered by mmhmm inc., Prezi Inc., Loom, Inc., and other companies allow presenters to appear next to their asynchronous presentations with rich custom backdrops, physical and virtual objects, and innovative scene organization mechanisms. An image of a presenter may be captured by a front camera of a device of the presenter or by a separate camera and separated (segmented) from the background of a physical environment of the presenter. A presenter may reposition an image of the presenter across the presentation materials, resize the image, add visual effects, etc.

Still, despite the emergence of different types of immersive interfaces, the engagement level of users—viewers who watch and study the presentation, remains the key efficiency metrics of the presentation. Multimodal sentiment analysis forms the basis for assessment of user engagement, emotions, and attitude; sentiment analysis may employ both the non-verbal cues, such as facial expressions, postures, gestures, voice tone, and the linguistic sentiment extraction from verbal textual feedback in user comments, speech-to-text conversion (speech recognition) when a team of users, such as a watch party, is collectively viewing an asynchronous video and may discuss the asynchronous video. Increasingly, different types of physiological monitoring (pulse rate, perspiration, facial color, galvanic skin response, etc.) are made possible through growing use of wearable devices and sensors. NICE, Activa and many other vendors are incorporating affective computing and sentiment analysis into real-time assisting systems for automotive industry, Customer Relationship Measurement (CRM), Customer Experience (CS) and other areas. Early attempts have been made in remote education, where sentiment analysis has been used to produce emotional profiles of students and applied to the subsequent categorization, processing, and planning of the remote educational processes.

Notwithstanding the progress in developing applications of sentiment analysis in various areas, there are many unsolved problems in automatic facilitation of viewing of asynchronous video content by individual or team users. User attention span depends on many factors, including complexity and quality of presentation materials, such as slides or other visuals, presentation speed, clarity of a voice of a presenter, intonations, and logic, and many other presentation features. User attention span may also depend on the presentation environment, a background of the presentation environment, and acoustic properties.

Accordingly, it is desirable to develop mechanisms and systems for assessment and non-invasive facilitation of user (viewer) engagement and enhancing presenter performance in creating asynchronous video content.

According to the system described herein, adapting an asynchronous audio-visual presentation includes storing custom backdrops prior to presenting the asynchronous audio-visual presentation, assessing a degree of engagement for at least some of the participants by monitoring participant reactions and feedback while presenting the asynchronous audio-visual presentation, and modifying the asynchronous audio-visual presentation based on the degree of engagement of at least some of the participants by replacing a backdrop of the asynchronous audio-visual presentation with one of the custom backdrops. Adapting an asynchronous audio-visual presentation may also include storing custom background audio clips prior to presenting the asynchronous audio-visual presentation and modifying the asynchronous audio-visual presentation based on the degree of engagement of at least some of the participants by either adding one of the custom background audio clips or replacing background audio of the asynchronous audio-visual presentation with one of the custom background audio clips. The degree of engagement of each of the participants may be positive/productive, angry/over-reacting, or indifferent. The degree of engagement of each of the participants may be based, at least in part, on non-verbal cues. The non-verbal cues may include postures, gestures, gaze direction and facial expressions that are captured by cameras of the participants and/or physiological parameters of at least some of the participants. The physiological parameters may include pulse rate, perspiration, facial color, and/or galvanic skin response. A single participant may view the asynchronous audio-visual presentation or multiple participants may view the asynchronous audio-visual presentation. Assessing a degree of engagement may include creating a histogram having a plurality of bins that each represent a number of participants exhibiting a particular degree of engagement. The feedback may include verbal cues of the participants. The verbal cues may include instant voice messages, text messages, voice communications, text chat, forum discussions and/or a poll dedicated to the asynchronous audio-visual presentation. The degree of engagement may correspond to a weighted sum of a first number of the participants that are positive/productive, a second number of the participants that are angry/over-reacting and a third number of the participants that are indifferent.

According further to the system described herein, creating an asynchronous audio-visual presentation includes collecting a plurality of parameters of a presenter and the asynchronous audio-visual presentation while recording the asynchronous audio-visual presentation, registering potential issues by detecting deviations from rules of each portion of the asynchronous audio-visual presentation based on the parameters, and a virtual coach pointing out to the presenter any deviations of the asynchronous audio-visual presentation from the rules and offering recommendations and instructions to modify at least some of the parameters to address the deviations. At least some of the rules may be predetermined. The parameters may include talking speed of the presenter, speech volume of the presenter, speech pauses of the presenter, speech pitch of the presenter, speech emphasis of the presenter, complexity of visual materials, font size of the visual materials, contrast of the visual materials, color palette used for visual materials, and/or frequency of changing slides of the visual materials. The asynchronous audio-visual presentation may be modified by increasing presentation times for portions of the asynchronous audio-visual presentation that contain material that is more complex than other portions of the asynchronous audio-visual presentation and/or changing a backdrop in a portion of the asynchronous audio-visual presentation. The asynchronous audio-visual presentation may be modified manually by the presenter in response to instructions from the virtual coach. The asynchronous audio-visual presentation may be modified automatically. At least some of the rules may include rules determined by classifiers using machine learning. The classifiers may receive, as input, data relating to degrees of engagement for participants by monitoring reactions of the participant and feedback of the participants while presenting a different asynchronous audio-visual presentation. The virtual coach may prompt the presenter to pause the asynchronous audio-visual presentation after changing backdrops, replay background music to wait for audio-video modifications, change posture, speak louder, speak softer, speak slower, speak faster, spend more time on complex slides, and/or skip complex portions of the asynchronous audio-visual presentation.

According further to the system described herein, a non-transitory computer readable medium contains software that adapts an asynchronous audio-visual presentation. The software includes executable code that stores custom backdrops prior to presenting the asynchronous audio-visual presentation, executable code that assesses a degree of engagement for at least some of the participants by monitoring participant reactions and feedback while presenting the asynchronous audio-visual presentation, and executable code that modifies the asynchronous audio-visual presentation based on the degree of engagement of at least some of the participants by replacing a backdrop of the asynchronous audio-visual presentation with one of the custom backdrops. The software may also include executable code that stores custom background audio clips prior to presenting the asynchronous audio-visual presentation and executable code that modifies the asynchronous audio-visual presentation based on the degree of engagement of at least some of the participants by either adding one of the custom background audio clips or replacing background audio of the asynchronous audio-visual presentation with one of the custom background audio clips. The degree of engagement of each of the participants may be positive/productive, angry/over-reacting, or indifferent. The degree of engagement of each of the participants may be based, at least in part, on non-verbal cues. The non-verbal cues may include postures, gestures, gaze direction and facial expressions that are captured by cameras of the participants and/or physiological parameters of at least some of the participants. The physiological parameters may include pulse rate, perspiration, facial color, and/or galvanic skin response. A single participant may view the asynchronous audio-visual presentation or multiple participants may view the asynchronous audio-visual presentation. Assessing a degree of engagement may include creating a histogram having a plurality of bins that each represent a number of participants exhibiting a particular degree of engagement. The feedback may include verbal cues of the participants. The verbal cues may include instant voice messages, text messages, voice communications, text chat, forum discussions and/or a poll dedicated to the asynchronous audio-visual presentation. The degree of engagement may correspond to a weighted sum of a first number of the participants that are positive/productive, a second number of the participants that are angry/over-reacting and a third number of the participants that are indifferent.

The proposed system provides both a deferred and a real-time adaptation of asynchronous video content, aimed at strengthening user engagement, including customized backdrops and background audio; the system also deploys and advances a virtual coach assisting an author (presenter) in creating and modifying the video content. Adaptive backdrops may be customized for groups (teams) of users, or for different categories of individual users who are viewing the video content. The changes in presentation environment may follow user input converted into engagement assessment. The assessment of user engagement is based on a user engagement index obtained from a multi-modal user sentiment analysis, which is a technology stack of emotion recognition components. Dependencies between presentation parameters and presenter behavior, on the one hand, and user engagement, on the other hand, may be determined via multi-phase incremental learning. A decision-making component determines whether one or multiple system actions should be taken to improve the participant engagement index. The system builds different instances of a virtual coach with specific sets of advisory rules through machine learning; the advisory rules may be augmenting a set of pre-defined general rules.

Various aspects of system functioning are explained as follows:

1. Characteristics of Presenter and User Feedback.

The system follows a presenter (author) through the recording of a video and analyzes presentation materials (e.g., slides, illustrations, audio and video clips, physical and virtual objects located in the presentation space, backdrops, background sounds, behavior of the presenter, and talk). A technology component (technology stack) of the system captures verbal and non-verbal features of the presentation using facial, gesture and posture recognition, gaze direction, speech-to-text conversion, text recognition from images (OCR) and handwriting of the presenter (NHR—Natural Handwriting Recognition), voice emotion recognition, general image recognition (recognizing objects in the presentation space and presentation material), etc. Most of the recognition technologies may use the front-facing camera and the microphone of a notebook or other device used by the presenter to create video content. Additional equipment (e.g., cameras, microphones, eye-tracking features of presenter's hardware) may be used, as well as accelerometers, proximity sensors and physiological monitoring features of mobile and wearable devices.

Example 1. In immersive presentations, eye-tracking (gaze direction recognition) feature may help the system to identify a dynamic visual presentation focus on certain portions of the presentation materials and compare the focus points with a reflection of the focus points in a talk of the presenter (which may use speech recognition and natural language processing), driving potential recommendations on improvements in the talk.

The combination of verbal and non-verbal features captured during the asynchronous recording of video content by the presenter may be sent to an affective computing/multi-modal sentiment recognition component for constant monitoring of emotions, mood, and attitudes of the presenter, which facilitates an overall assessment of the presentation quality and allows for assisting the presenter, as explained elsewhere herein.

Once the video content is published and becomes accessible by the users (content viewers), the system engages in tracking user reactions to the presentation and engagement levels of the users using some of the technologies employed for tracking the video authoring process, as explained above.

There are two main types of consuming video content: individual and group viewing:

During the individual viewing, the system mostly captures non-verbal cues: facial expressions, gestures, gaze direction, physiological parameters of a user viewing the video content. The spectrum of captured characteristics may depend on the available hardware and software installation of the user. Additional information may be available post-viewing, including ratings, textual, and non-verbal feedback (for example, emoticons) for the video content.

A collective (group, team, watch party) viewing of video content by a group of users may provide a richer set of feedback features, since the users may exchange instant voice and text messages and non-verbal communication features, such as grimacing or making communicative gestures of approval or disproval of the video content. Post-viewing features may also provide a more extensive material compared to the individual viewing, including, for example, a forum discussion or a poll dedicated to a recently viewed presentation. The system may be required to obtain permission from the participants to access certain categories of feedback features.

2. Assessing User Engagement. User Engagement Index.

Analogously to the presenter monitoring case, the captured user feedback characteristics may be fed into a multimodal affective computing/sentiment recognition component of the system to assess user engagement with the video content.

As an example, various degrees of user engagement may be expressed by the scale:

{Positive/productive mood|Angry/over-reacting mood-|Indifferent mood}

Users may often have intermediate attitudes for a significant portion of viewing time, as attention, attitude and comprehension levels of the users vary through the presentation (or other type of the video content). Therefore, a vector value of a User Engagement Index (UEI) may be presented as a combination of several scales jointly occupying the user sentiment space, for example, {Positive—70%; Angry—10%; Indifferent—20%}, and a summary engagement metric (SUEI) may be calculated as a weighted sum of the partial values; thus, with an aggregation scheme P–A–0.5×I (where P, A, I are the Positive, Angry, and Indifferent partial values), the previous example has the SUEI=50% (70%-10%-0.5×20%).

User attention, reactions and engagement levels may oscillate through the viewing process (the presentation flow); therefore, both the momentary (vector) values of the UEI and the aggregated value SUEI may be represented as a graph over the viewing time scale. A sufficiently long period of undesirable values of the SUEI (for example, below 40% for a continuous two-minute period) may signify a problem and cause a decision-making component of the system to search for an action to improve user engagement.

3. Decision-Making and System Actions.

If user engagement, expressed by the SUEI metric, stays at an undesirable level for a sufficient period of the video duration, the system may use a decision-making component of the system to determine an appropriate system response.

For example, the decision-making component may choose to alter a backdrop of the conference space to stimulate a change in a mood of an individual user, for example, to calm down an over-reacting user (for example, an angry user) or to energize an indifferent user. The decision-making component may also add a replay of a quiet background audio to amplify a visual effect of a backdrop. A collection of backdrops and audio clips may be stored in a designated portion of system resources and may be introduced through various visual (contrast, color, ornament, visual effects, text elements) and audio (pitch, melody, accompaniment) mechanisms, signifying a "call for action" to change the user attitude.

Different customized backdrops and audio may be delivered to different users or even to individual users during a group viewing session based on an assessment of emotional status and engagement of the users (the latter assumes that the group viewing session, such as a watch party, is conducted by users joining the session from individual computers).

The system may monitor the effect of custom backdrop and music on the UEI and on the engagement levels of individual users. If user engagement does not improve or improves slowly, the system may alter the backdrop and audio samples for an interval of time, assessing the effect of each item, and may subsequently continue with the item that has shown the best progress for a particular user.

Since the video content offered to a user has been pre-recorded, altering audio-video characteristics of the video content (custom backdrops and background audio) on the fly requires a degree of interactivity built into the presentation recording mechanism. For example, certain portions of the video content may be designated by the system and/or presenter for optional changes of the backdrop and background audio during the replay using system features. Additionally, a brief pause in the presentation flow and a short system notification may accompany the interactivity episodes.

UEI dynamics and dependencies of the UEI dynamics on system actions (such as visual backdrops and background audio) may be stored in a system analytics component and serve as training examples both for presenters and for incremental machine learning, which accumulates a history of video content created by each presenter and corresponding user feedback.

4. Analyzing Presentation and Presenter Behavior. General and Advisory Rules. Virtual Coach.

Various parameters of the presentation and of presenter behavior may be collected at the video recording phase, as explained in Section 1 above. The parameters may include speech characteristics of the presenter, such as talking speed, volume, pauses, pitch, emphasis, along with the parameters of visual materials, including complexity and density of visuals on various slides, font size, contrast, color palette, frequency of changing slides, etc.

The system may register potential issues in a new presentation by measuring deviations of the new presentation from a system of general rules pre-recorded in the system (for example, excessive complexity of certain presentation materials, combined with an insufficient talking time spent on the materials; unusual or unacceptable behaviors, such as blowing presenter's nose, combing hair, or itching, as described in U.S. Pat. No. 11,632,258 by Phil Libin titled: "RECOGNIZING AND MITIGATING DISPLAYS OF UNACCEPTABLE AND UNHEALTHY BEHAVIOR BY PARTICIPANTS OF ONLINE VIDEO MEETINGS", which issued on Apr. 18, 2023 and is incorporated by reference herein). The list of deviations may be stored in the systems analytics component. Upon the completion of recording of a video, the system may initiate a virtual coach (possibly in the form of an AI-driven chatbot) to point out the issues in the new presentation and offer recommendations and instructions on improving the video before publication of the presentation.

In addition to general rules, the system may accumulate advisory rules developed by the system in the process of accumulation, analysis and machine learning associated with viewing of the published video content by individual and group users, as explained in Sections 2, 3 above. Advisory rules may include, for example, the addition and schedule for certain types of audio-video enhancements (backdrops, background audio) and a selection of most efficient enhancements based on the cumulative user experience. Such advisory rules may be represented by classifiers, developed through multiple incremental phases of machine learning, and may accompany the authoring history of a presenter. Accordingly, some of the rules may be offered retroactively and formulated as recommendations by a virtual coach (derived from the above classifiers) to fix a video recording that has caused issues with user engagement. Subsequently, the retroactive advisory rules may be added to the full set of rules and may assist a presenter, facilitated by the virtual coach, in building new asynchronous videos.

Example 2. A virtual coach may deliver specific behavioral advice to the presenter, aimed at a modification of previously published or newly compiled video content, such as:

Authorizing brief pauses in the presentation after the system automatically adds new backdrops and/or a replay of background music to allow the audio-video modifications to kick in.

Changing posture of the presenter ("don't slouch", "look more often directly at the audience").

Speaking louder or softer, slower, or faster.

Spending more time on complex slides or allowing an interactive option of skipping one or more complex portions of the presentation.

5. Engagement Analytics and Machine Learning.

The system may collect and process engagement analytics, associating the analytics with the presentations, presenters, and system actions, as explained elsewhere herein. Statistics based on the analytics may be added to an aggregated statistics repository of the system; analytic reports may be periodically distributed to presenters and users. Fragments of video content accompanying engagements analytics may be used as training materials for multiple incremental sessions of machine learning, aimed at improving the efficiency of system actions, recommendations and instructions to presenters, and performance of the virtual coach. Classifiers developed through machine learning sessions may serve as core components of advisory rules.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides methods, techniques, and workflows for deferred and real-time modifications of asynchronous video content, aimed at strengthening user engagement, including customized backdrops, background audio and virtual coach offering recommendations to authors of video content.

Figure 1:
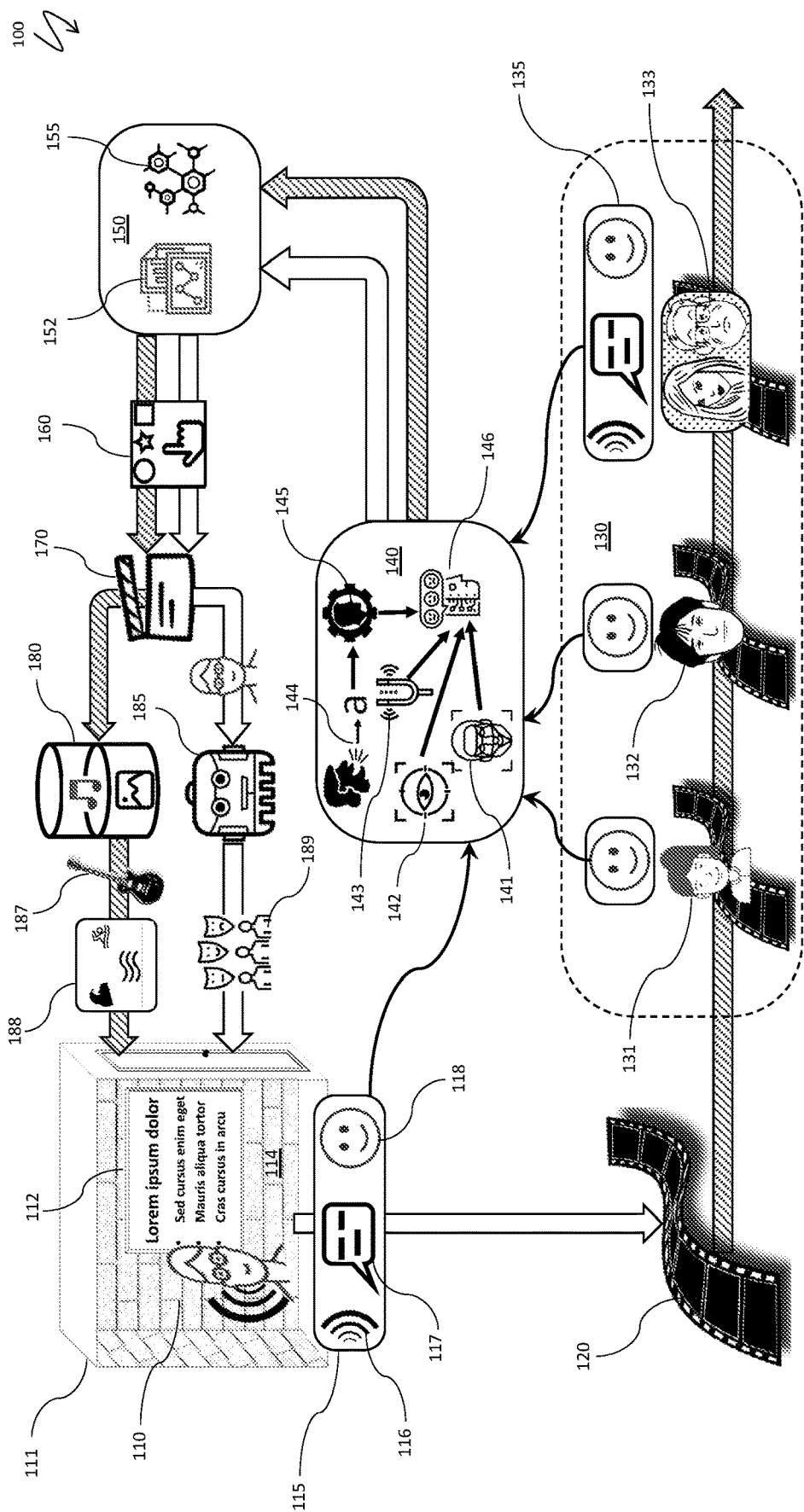
FIG. 1 is a schematic illustration of system architecture and workflow, according to an embodiment of the system described herein.

FIG. 1 is a schematic illustration 100 of system architecture and workflow. A presenter 110 (an author of asynchronously recorded video content) is immersed into a presentation space 111, as described in U.S. Pat. No. 11,317,060 to Phil Libin titled: "INDIVIDUAL VIDEO CONFERENCING SPACES WITH SHARED VIRTUAL CHANNELS AND IMMERSIVE USERS", which issued on Apr. 26, 2022, and which is incorporated by reference herein. The presenter 110 appears on top of presentation materials 112 and a virtual backdrop 114 and delivers the presentation via expressive mechanisms 115, which include voice 116, text 117 and non-verbal cues 118 associated with the visual appearance of the presenter.

Figure 3:
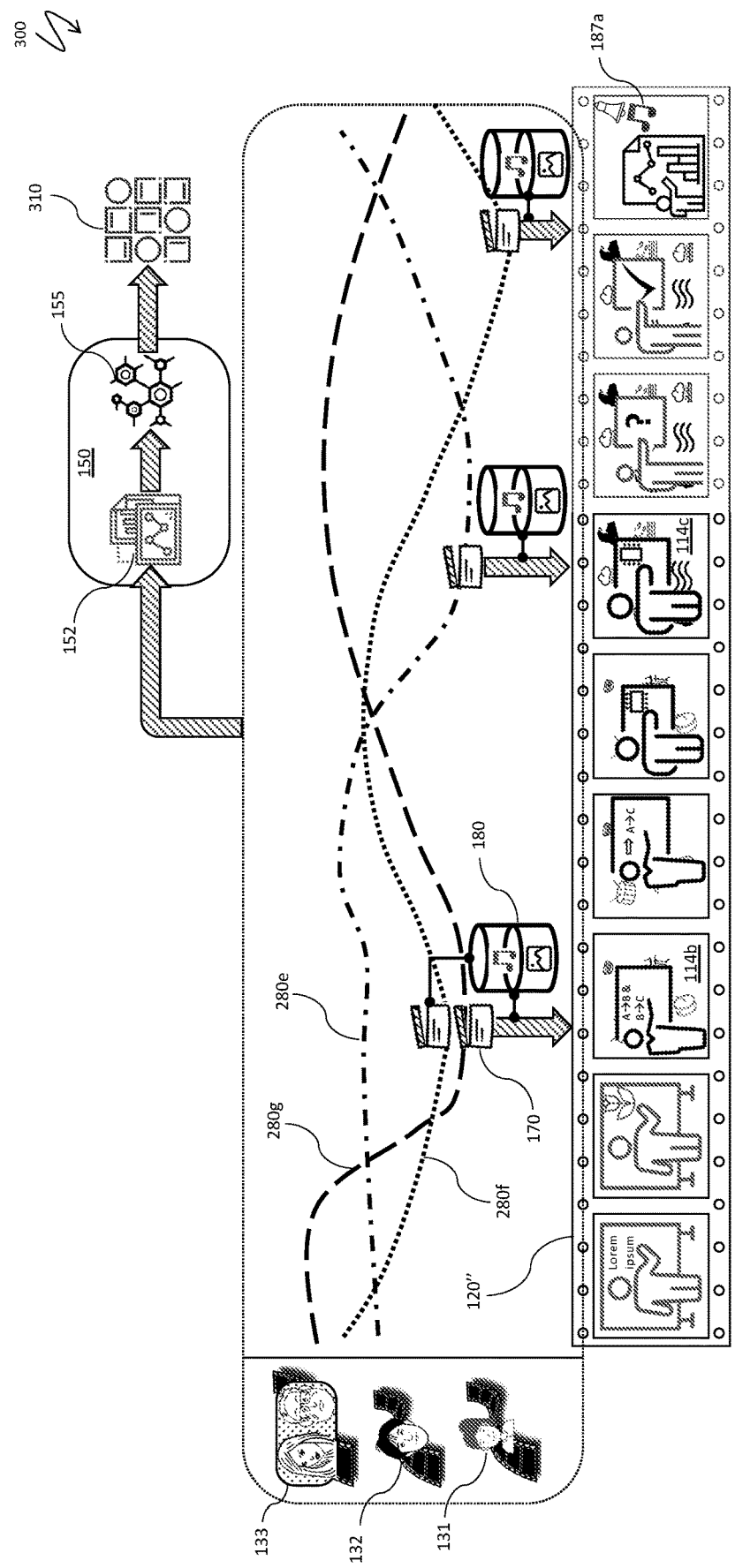
FIG. 3 is a schematic illustration of tracking multiple viewing sessions, collecting training material, and machine learning, according to an embodiment of the system described herein.
Figure 4:
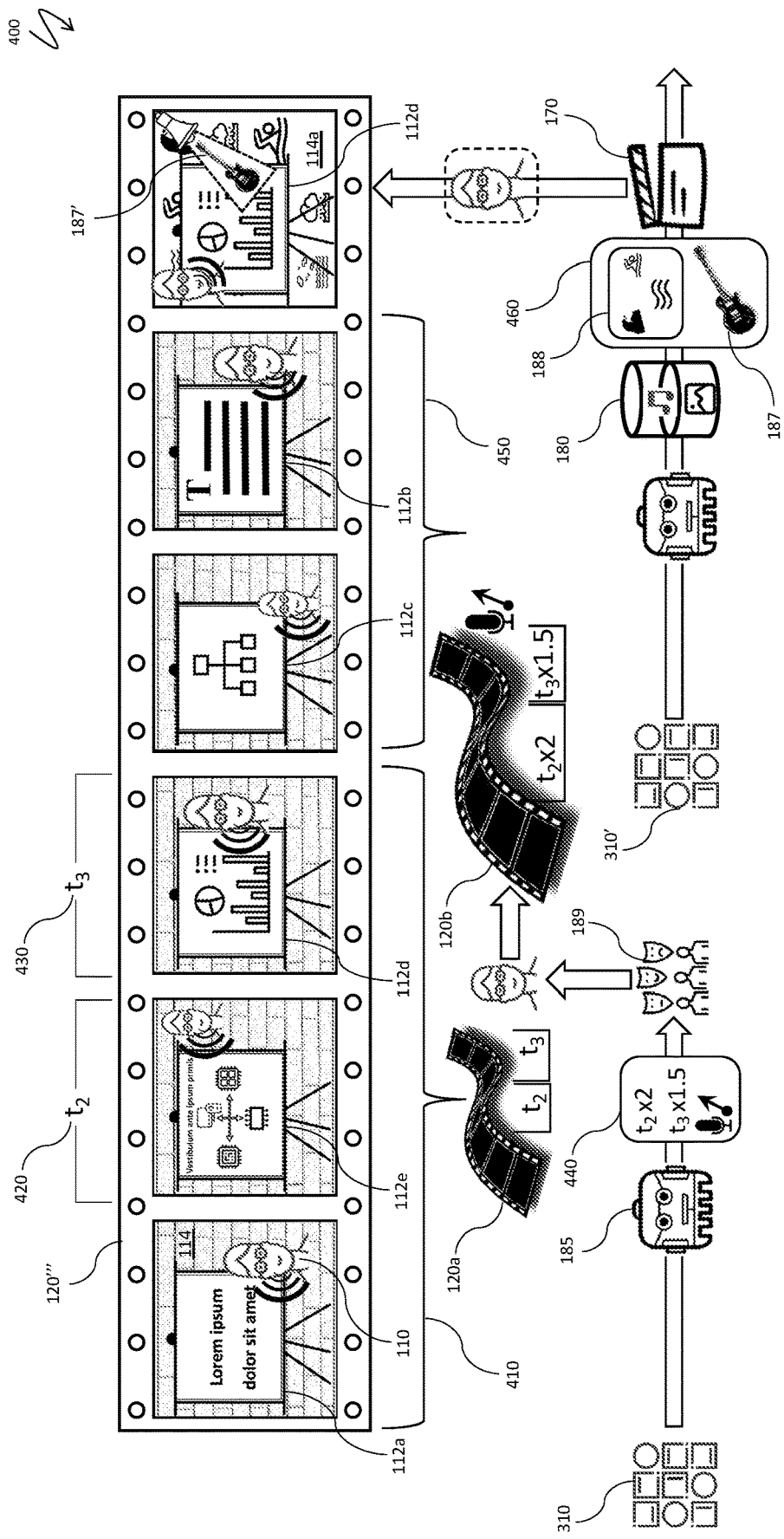
FIG. 4 is a schematic illustration of advisory rules and a virtual coach, according to an embodiment of the system described herein.

The presenter 110 creates and publishes video content 120 of the presentation. Subsequently, multiple users (viewers) 130 watch the video content 120 at different times and from different locations, including individual users 131, 132, and a group of users 133 (team, watch party, etc.) who watch the presentation jointly (possibly from different locations). User feedback to the presentation may be expressed via non-verbal cues (similar to the item 118), characteristic for all categories of users, and through verbal mechanisms 135, including voice communications, text chat, forum discussions, and other mechanisms for information exchange between members of collective synchronous viewing of the presentation. Note that blank block-arrows in FIGS. 1, 4 are associated with the workflows related to an author (presenter) of the pre-recorded video content, while filled block-arrows in FIGS. 1, 2, 3 show the workflows associated with viewers (users) of the video content.

Figure 2:
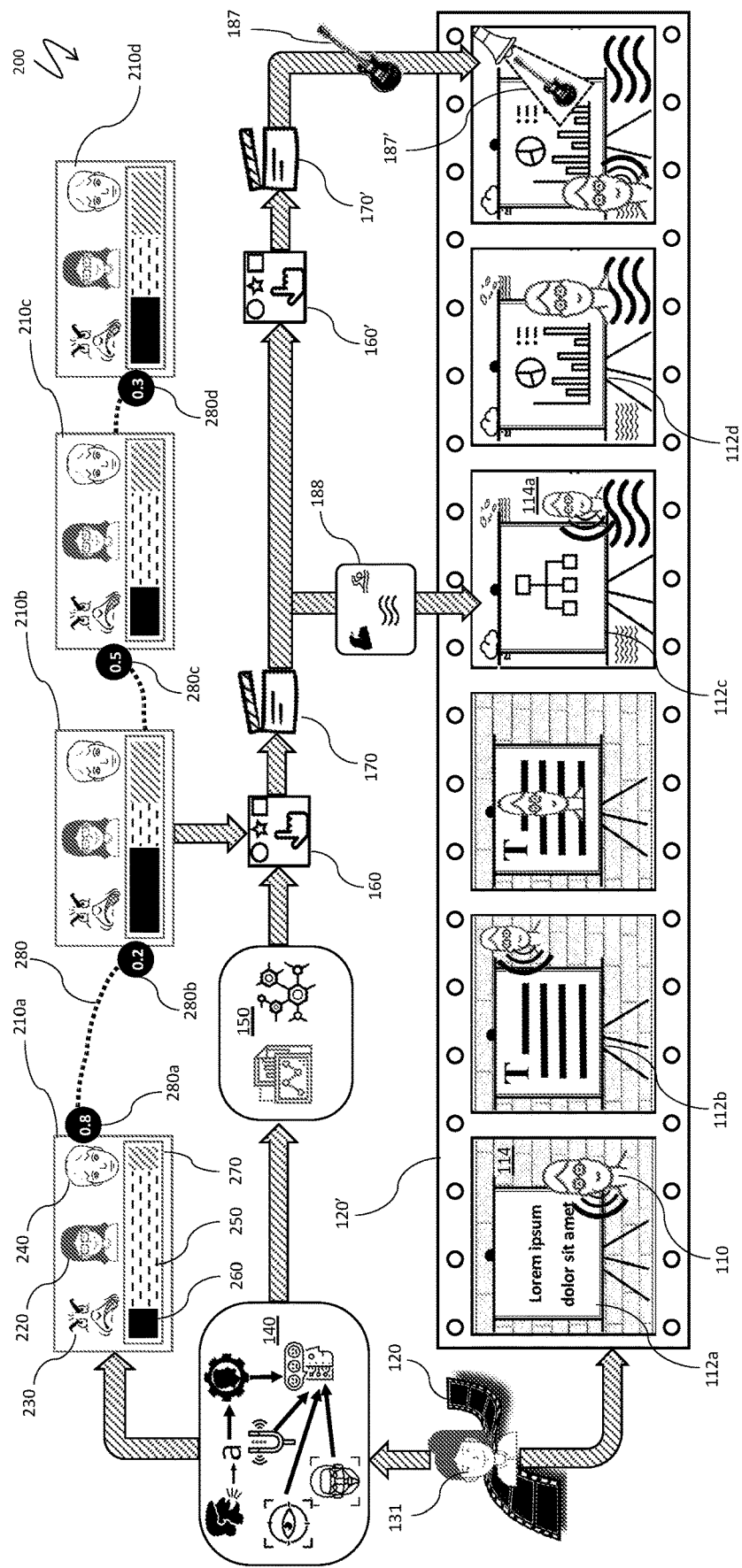
FIG. 2 is a schematic illustration of the viewing process, user engagement index, and automatic audio-video modifications, according to an embodiment of the system described herein.

Verbal and non-verbal expressive mechanisms of the presenter and viewers may be captured and processed by technology components 140 (technology stack) of the system, which may include facial recognition 141, eye-tracking technology 142, voice emotion recognition 143, speech-to-text conversion (speech recognition) 144, natural language processing 145, sentiment recognition 146 and other technologies not shown in FIG. 2, such as gesture recognition, general image recognition (for identifying different types of physical and virtual objects in the presentation space 111), various technologies used in affective computing, etc.

Processed results of capturing verbal and non-verbal characteristics of a presenter and users by the technology components 140 are sent to a system analytics and machine learning subsystem 150, where a system analytics component 152 organizes, processes, and generalizes information, including assessments of user engagement (User Engagement Indexes UEI and SUEI explained elsewhere herein—see, for example, Section 2 of the Summary). The system analytic component 152 also prepares training samples for incremental machine learning sessions based on the UEI assessments; machine learning is conducted by an ML component 155.

The analytics component 152 may initiate decision-making actions 160 aimed at improvements in the video content and in viewing experiences, which may lead to system actions 170 (see Section 3 of the Summary). Two types of system actions are shown in FIG. 1: automatic real-time audio-visual modifications of the presentation, and recommendations to the presenter 110 at the video recording phase made by a virtual coach and aimed at changing the behavior and presentation manner of the presenter 110. Audio-video modifications start with searching of an optimal backdrop and audio clip in an audio-video database 180; subsequently, a retrieved backdrop 188 and audio content 187 are added to the conference space, possibly replacing existing items. A virtual coach 185 analyzes general and advisory rules (not shown in FIG. 1), generates recommendations for altering the presentation flow and presenter behavior and transfers recommendations and instructions 189 of the virtual coach 185 to the presenter 110.

FIG. 2 is a schematic illustration 200 of the viewing process, user engagement index, and automatic audio-video modifications. A detailed view of the video content 120 is represented by a six-frame film strip 120' viewed by the user 131 (see FIG. 1). A first frame shows the presenter 110 explaining material 112a, and the backdrop 114; in second and third frames, the material 112a is changed to different material 112b, and the presenter 110 repositions an image of the presenter 110 in each frame to focus explanations and to point to necessary portions of the materials 112a, 112b.

Reactions of the user 131 to the video content 120 (for example, non-verbal cues) are captured by the technology components 140, processed and transferred to the system analytics and machine learning subsystem 150, as explained in FIG. 1 and the accompanying text. Based on information entered into the analytics component, the system assesses the User Engagement Index (UEI), illustrated by items 210a-210d, and the Summary Engagement metric (SUEI) for each of the items 210a-210d; SUEI values are shown on an engagement graph 280 as items 280a-280d. In the examples of FIG. 2, User Engagement Index is represented as a histogram of relative intensities of emotional states, explained in Section 2 of the Summary:

Positive/productive mood 220—intensity value 250
Angry/over-reacting mood 230—intensity value 260
Indifferent mood 240—intensity value 270

(the three emotional states are reordered in UEI charts 210a-210d of FIG. 2 to show the positive mood in the middle portion of the UEI). The histogram may have a plurality of bins that each represent a number of participants exhibiting a particular degree of engagement.

Based on the aggregation rule (see example and discussion in Section 2 of the Summary), the summary SUEI engagement value 280a is 0.8. However, by the time of reaching the presentation point corresponding to the third illustrative frame of the film strip 120', user engagement significantly declines: the UEI chart 210b shows the prevalence of the mix of negative and indifferent (withdrawal) emotions, which results in the SUEI dropping to the value 280b (0.2), which is below an action threshold. Accordingly, the analytics component initiates one of the system actions 170, a decision-making step, which leads to a decision to update the system backdrop and selection of the retrieved backdrop 188, which is an optimal backdrop (note the assumption that the presentation is interactive and allows for automatic presenter-independent modifications, as explained in Section 3 of the Summary). The backdrop 188 replaces the background 114 in the fourth illustrative frame of the film strip 120' with a background 114a (note that in this frame presentation material 112c is introduced).

Following the visual enhancement of the presentation space, user engagement recovers and reaches the SUEI value 0.5—item 280c associated with the UEI 210c. However, as the presentation progresses and complex presentation material 112d replaces the material 112c, the engagement level of the user 131 starts declining again and drops to the SUEI value 0.3, as illustrated by the item 280d associated with the last UEI chart 210d. The decline causes another decision-making step 160' resulting in a new system action 170', which adds an audio enhancement in the form of a music tune 187, converted into a background music replay 187' in the last frame of the film strip 120'.

FIG. 3 is a schematic illustration 300 of tracking multiple viewing sessions, collecting training material, and machine learning. Multiple ones of the users 131-133 (see FIG. 1 for initial descriptions) are viewing an asynchronous video content represented by a film strip 120" with nine frames showing presentation progress. Dynamic levels of user engagement are exemplified by three SUEI graphs 280e, 280f, 280g, corresponding to the users 131-133. The system actions 170, search in the audio-visual database 180, and user engagement values(?) results in backgrounds 114b, 114c, and in background audio 187a and show the process of tracking user engagement and associated system actions, explained elsewhere herein (see FIG. 2 and the accompanying text).

Through the course of tracking viewing sessions and taking the appropriate system actions, the system may collect training samples, showing fragments of SUEI graphs, captured user emotional states and sentiments, reflected in the engagement values, system decisions and actions, and success or failure of system decisions to increase engagement levels. Such samples may be stored in the system analytics component 152 of the analytics and machine learning subsystem 150. Upon reaching a sufficient volume of new training samples, the system may activate the machine learning component 155 for a new incremental machine learning session, which results in a classifier 310 predicting system actions, parameters of the system actions, and the effect of automatic system actions on the engagement levels based on the presentation parameters and generalized characteristics of a user audience.

FIG. 4 is a schematic illustration 400 of advisory rules and a virtual coach. A completed but unpublished asynchronous video content is represented by a film strip 120''' with six frames showing key points of a presentation. A first segment 410 of the presentation analyzed by the system is characterized by three frames: the utmost left frame of the segment is the same as in FIG. 2, with the backdrop 114, where the presenter 110 is explaining the material 112a. In the next frame, the presentation material is switching to a relatively complex different presentation material 112e with a presentation time 420 ($t_2$); the final frame of the segment shows the complex presentation material 112d; presentation time 430 for the material 112d is $t_3$.

The system is applying general and advisory rules to the segment, as explained elsewhere herein. An advisory rule based on the classifier 310 has been obtained through machine learning representing engagement characteristics for multiple users that have been previously viewing one or multiple copies of asynchronous video content recorded by the presenter 110, as explained in connection with FIG. 3. The advisory rule assesses that presentation times for the complex presentation material 112d and the complex presentation material 112e explained in a row are insufficient and that the audio volume in the recorded video is too low. Accordingly, the system prepares recommendations for the presenter 110, the virtual coach 185 formats the recommendations as instructions 440 recommending a 2× time increase for the presentation material 112e in the segment 410, a 1.5× time increase for the presentation material 112d in the segment and turning up the audio volume for the segment. The instruction is delivered to the presenter 110 by the virtual coach 185 as a behavioral suggestion 189. The presenter 110 edits the video and replaces a portion 120a of the video content corresponding to the segment 410 with a modified portion 420b where all instructions are executed.

A next segment 450 of the presentation is characterized by two key frames where the presenter 110 explains the slides 112c, 112b. After processing the segment 450 using general and advisory rules, the system determines that user engagement level by the end of the segment 450 may fall below the acceptability threshold. System recommendations are based on an advisory rule associated with a classifier 310' obtained earlier through the machine learning process (see FIG. 3 for details). The system prepares recommendations, which include an audio-visual enhancement of the final frame in the film strip 120''', which immediately follows the segment 450. The system searches in the audio-visual repository, prepares instructions 460, which include the backdrop 188 and the background audio 187, and the virtual coach delivers the instructions 460 to the presenter as a system action 170, which may be executed by the presenter 110 or performed automatically (see FIG. 2 and the accompanying text); the system action replaces the background 114 with the background 114a and replays the background audio 187.

Figure 5:
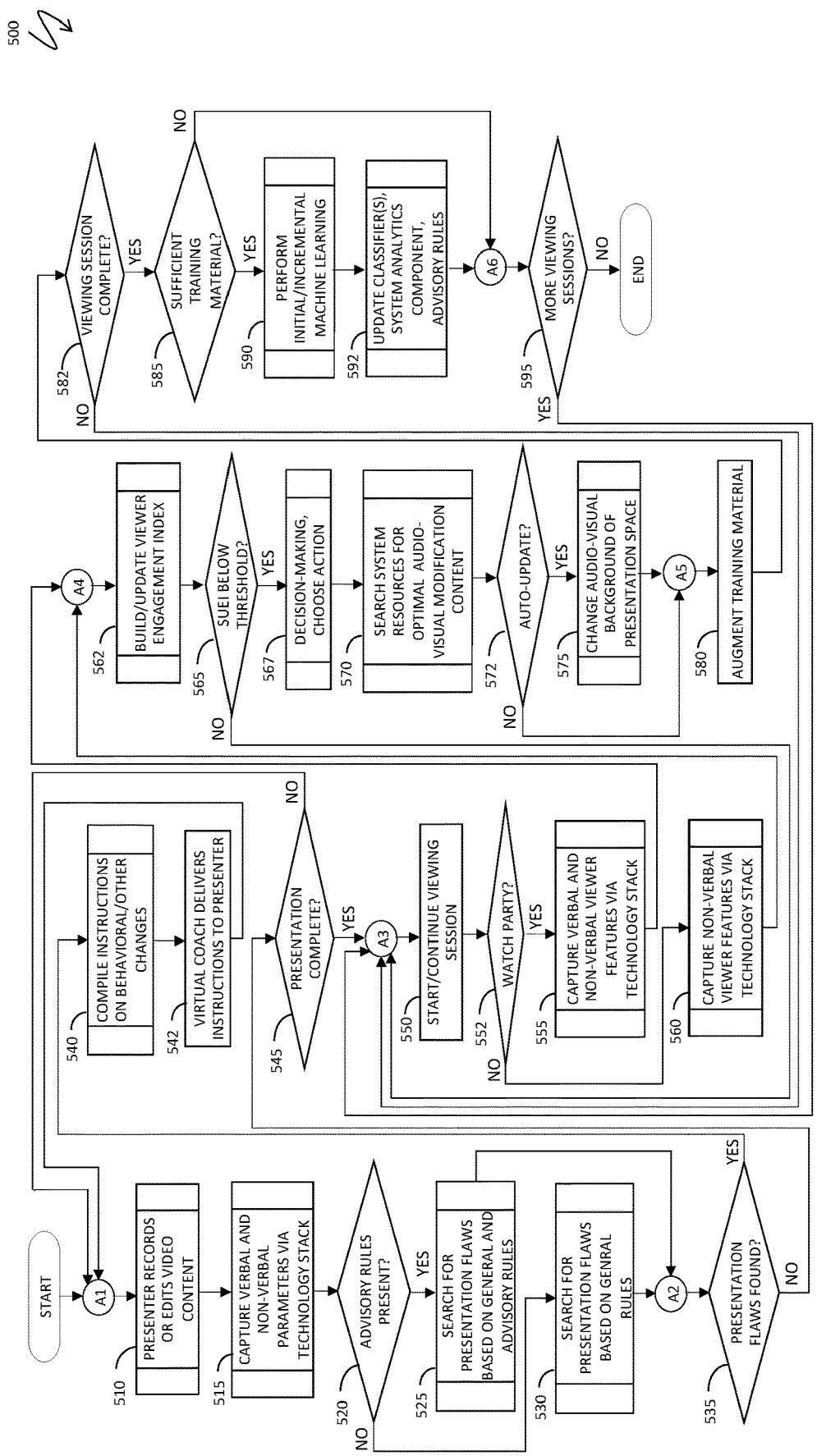
FIG. 5 is a system flow diagram illustrating system functioning in connection with authoring and viewing presentations, machine learning, and functioning of virtual coach, according to an embodiment of the system described herein.

Referring to FIG. 5, a system flow diagram 500 illustrates system functioning in connection with authoring and viewing presentations, machine learning, and functioning of a virtual coach. Processing begins at a step 510, where a presenter records or edits video content. After the step 510, processing proceeds to a step 515, where the system captures presentation materials, environment, verbal, and non-verbal characteristics of the presenter via technology stack. After the step 515, processing proceeds to a test step 520, where it is determined whether the advisory rules for the presenter (based on classifiers obtained from machine learning) have been added to the system. If so, processing proceeds to a step 525, where presentation flaws are detected using general and advisory rules; otherwise, processing proceeds to a step 530, where presentation flaws are detected using general rules. After each of the steps 525, 530, processing proceeds to a test step 535, where it is determined whether presentation flaws have been found. If so, processing proceeds to a step 540, where recommendations and instructions on behavioral and other changes to the recorded video are compiled by the analytics component of the system (see FIG. 4 and the accompanying text for more information). After the step 540, processing proceeds to a step 542, where the virtual coach delivers instruction to the presenter, as explained elsewhere herein (see FIG. 4 and the accompanying text). After the step 542, processing proceeds back to the step 510, described above, where the presenter may modify the video content based on the received instructions.

If it is determined at the test step 535 that presentation flaws have not been found, processing proceeds to a test step 545, where it is determined whether the video content recording is complete. If not, processing proceeds back to the step 510, described above, which may be independently reached from the step 542. If it is determined at the test step 545 that video content recording is complete, processing proceeds to a step 550, where one or multiple users are starting or continuing a viewing session for the recorded content (note that publishing steps for the recorded video content may be present but are not shown in FIG. 5). After the step 550, processing proceeds to a test step 552, where it is determined whether the viewing session has multiple participants (for example, a watch party). If so, processing proceeds to a step 555, where verbal and non-verbal viewer features are captured via technology stack; otherwise, processing proceeds to a step 560, where non-verbal viewer features are captured via technology stack. After each of the steps 555, 560, processing proceeds to a step 562, where the system builds or updates the User Engagement Index (UEI) and the summary engagement metric SUEI, as explained, for example, in FIG. 2 and the accompanying text.

After the step 562, processing proceeds to a test step 565, where it is determined whether the SUEI metric is below the acceptability threshold. If not, processing proceeds to the step 550, which may be independently reached from the test step 545. Otherwise, processing proceeds to a step 567, where decision-making is performed and a system action (or multiple system actions) is/are chosen. After the step 567, processing proceeds to a step 570, where a system repository is searched for optimal audio-visual modification content, as explained elsewhere herein (see, for example, FIG. 2 and the accompanying text). After the step 570, processing proceeds to a test step 572, where it is determined whether an auto-update of the viewing session is possible and permitted. If so, processing proceeds to a step 575, where the audio-visual background of the presentation space is changed.

After the step 575, processing proceeds to a step 580, where the training material is augmented based on analysis of user engagement (see FIG. 3 and the accompanying text for details). Note that the step 580 may be independently reached from the test step 572 if it is determined that the auto-update is not possible or prohibited. After the step 580, processing proceeds to a test step 582, where it is determined whether the viewing session is complete. If not, processing proceeds to the step 550, which may be independently reached from the test steps 545, 565. If it is determined at the test step 582 that the viewing session is complete, processing proceeds to a test step 585, where it is determined whether a sufficient volume of new training material has been accumulated since the previous machine learning session. If so, processing proceeds to a step 590, where the system performs and initial or an incremental machine learning. After the step 590, processing proceeds to a step 592, where the classifier(s), system analytics component and the set of advisory rules are updated. After the step 592, processing proceeds to a test step 595, where it is determined whether there are more viewing sessions. If not, processing is complete; otherwise, processing proceeds to the step 550, which may be independently reached from the test steps 545, 565, 582 (note that the test step 595 may be independently reached from the test step 585 if it is determined that there is insufficient volume of training materials).

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets and other mobile computers. Smartphones and tablets may use operating system(s) selected from the group consisting of: iOS, Android OS, Windows Phone OS, Blackberry OS and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of creating an asynchronous audio-visual presentation, comprising:
    collecting a plurality of parameters of a presenter and the asynchronous audio-visual presentation while recording the asynchronous audio-visual presentation; registering potential issues by detecting deviations from rules of each portion of the asynchronous audio-visual presentation based on the parameters;
    pointing out by a virtual coach to the presenter any of the deviations of the asynchronous audio-visual presentation from the rules; and
    offering recommendations and instructions by the virtual coach to the presenter to modify at least some of the parameters to address the deviations, wherein the recommendations include at least one of: spending more time on at least one specific slide of the audio-visual presentation that is more complex than other slides of the audio-visual presentation or allowing an interactive option of skipping portions of the asynchronous audio-visual presentation that are more complex than other portions of the audio-visual presentation.

2. The method of claim 1, wherein at least some of the rules are predetermined.

3. The method of claim 1, wherein the parameters include at least one of: talking speed of the presenter, speech volume of the presenter, speech pauses of the presenter, speech pitch of the presenter, speech emphasis of the presenter, complexity of visual materials, font size of the visual materials, contrast of the visual materials, color palette used for visual materials, or frequency of changing slides of the visual materials.

4. The method of claim 1, wherein the asynchronous audio-visual presentation is modified by changing a backdrop in a portion of the asynchronous audio-visual presentation.

5. The method of claim 1, wherein the asynchronous audio-visual presentation is modified manually by the presenter in response to instructions from the virtual coach.

6. The method of claim 1, wherein the asynchronous audio-visual presentation is modified automatically based on instructions from the virtual coach.

7. The method of claim 1, wherein at least some of the rules include rules determined by classifiers using machine learning.

8. The method of claim 7, wherein the classifiers receive, as input, data relating to a degree of engagement for each of the participants by monitoring reactions of the participant and feedback of the participants while presenting a different asynchronous audio-visual presentation.

9. The method of claim 8, wherein the degree of engagement of each of the participants is one of: positive/productive, angry/over-reacting, or indifferent.

10. The method of claim 8, wherein the degree of engagement of each of the participants is based, at least in part, on non-verbal cues.

11. The method of claim 10, wherein the non-verbal cues include at least one of: postures, gestures, gaze direction and facial expressions that are captured by cameras of the participants or physiological parameters of at least some of the participants.

12. The method of claim 11, wherein the physiological parameters include at least one of: pulse rate, perspiration, facial color, or galvanic skin response.

13. The method of claim 8, wherein multiple participants view the asynchronous audio visual presentation.

14. The method of claim 13, wherein assessing a degree of engagement includes creating a histogram having a plurality of bins that each represent a number of the participants exhibiting a particular degree of en9gagement.

15. The method of claim 14, wherein the degree of engagement corresponds to a weighted sum of a first number of the participants that are positive/productive, a second number of the participants that are angry/over-reacting and a third number of the participants that are indifferent.

16. The method of claim 1, wherein the virtual coach prompts the presenter to do at least one of the following: pause the asynchronous audio-visual presentation after changing backdrops, replay background music to wait for audio-video modifications, change posture, speak louder, speak softer, speak slower, or speak faster.

* * * * *